United States Patent
Bylund et al.

(10) Patent No.: US 10,232,502 B2
(45) Date of Patent: Mar. 19, 2019

(54) POWER EQUIPMENT COOLING SYSTEM

(71) Applicant: HUSQVARNA AB, Huskvarna (SE)

(72) Inventors: Christian Bylund, Huskvarna (SE); Tobias Nyberg, Huskvarna (SE); Lars Malmqvist, Forserum (SE); Pär Martinsson, Jönköping (SE); Andreas Levander, Jönköping (SE); Jan Lejon, Norrahammar (SE); Fredrik Wibling, Malmbäck (SE); Jonas Haglind, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 17 days.

(21) Appl. No.: 15/124,414

(22) PCT Filed: Mar. 17, 2014

(86) PCT No.: PCT/EP2014/055296
§ 371 (c)(1),
(2) Date: Sep. 8, 2016

(87) PCT Pub. No.: WO2015/139723
PCT Pub. Date: Sep. 24, 2015

(65) Prior Publication Data
US 2017/0021489 A1    Jan. 26, 2017

(51) Int. Cl.
*B25F 5/00* (2006.01)
*A47L 5/14* (2006.01)
(Continued)

(52) U.S. Cl.
CPC .............. *B25F 5/008* (2013.01); *A01G 20/47* (2018.02); *A47L 5/14* (2013.01); *A47L 9/2884* (2013.01);
(Continued)

(58) Field of Classification Search
CPC ... B25F 5/08; B25F 5/00; A01G 20/47; A47L 9/2884; A47L 5/14; F04D 29/5813; F04D 29/0613; F04D 25/0673
See application file for complete search history.

(56) References Cited

U.S. PATENT DOCUMENTS 3,780,397 A   12/1973   Harbeck et al.
3,815,172 A   6/1974    Fromknect et al.
(Continued)

FOREIGN PATENT DOCUMENTS

CN   101731991 A   6/2010
JP   S59136043 A   8/1984
(Continued)

OTHER PUBLICATIONS

International Search Report and Written Opinion for International Application No. PCT/EP2014/055296 dated Nov. 13, 2014.
(Continued)

*Primary Examiner* — David Redding
(74) *Attorney, Agent, or Firm* — Burr Forman NcNair

(57) ABSTRACT

A method of cooling blower components may include rotating a fan assembly (160) responsive to operation of a motor (120). The rotation of the fan assembly may create an underpressure region in an inlet portion (154) and an overpressure region at a main channel (340) of the fan assembly (160). The method may further include drawing air into the inlet portion (154) through a control unit housing portion (132) of a housing (110) of the blower (100) to cool a control unit (130) of the blower (100), drawing air into the inlet portion (154) through a battery compartment (142) to cool a battery (140) of the blower (100), and pushing air from the main channel (340) through a motor housing (320) to cool the motor (120).

19 Claims, 4 Drawing Sheets

(51) Int. Cl.
- *F04D 29/58* (2006.01)
- *F04D 19/00* (2006.01)
- *A47L 9/28* (2006.01)
- *F04D 27/00* (2006.01)
- *F04D 29/38* (2006.01)
- *F04D 29/52* (2006.01)
- *F04D 29/54* (2006.01)
- *A01G 20/47* (2018.01)
- *F04D 25/06* (2006.01)

(52) U.S. Cl.
CPC .......... *F04D 19/002* (2013.01); *F04D 25/06* (2013.01); *F04D 25/0613* (2013.01); *F04D 27/00* (2013.01); *F04D 29/38* (2013.01); *F04D 29/522* (2013.01); *F04D 29/542* (2013.01); *F04D 29/5806* (2013.01); *F04D 29/5813* (2013.01); *F04D 25/0673* (2013.01)

(56) References Cited

U.S. PATENT DOCUMENTS

| | | | |
|---|---|---|---|
| 4,945,604 A | 8/1990 | Miner et al. | |
| 6,003,199 A | 12/1999 | Shaffer | |
| 6,105,206 A * | 8/2000 | Tokumaru | A01G 1/125 15/344 |
| 6,488,475 B2 | 12/2002 | Murata et al. | |
| 2008/0148513 A1 | 6/2008 | Shaffer | |
| 2009/0241285 A1* | 10/2009 | Hinklin | A47L 5/14 15/330 |
| 2012/0138717 A1 | 6/2012 | Svoboda et al. | |
| 2014/0234130 A1 | 8/2014 | Yamaoka et al. | |

FOREIGN PATENT DOCUMENTS

| | | |
|---|---|---|
| JP | H11125198 A | 5/1999 |
| JP | H11173298 A | 6/1999 |
| JP | H11187989 A | 7/1999 |
| JP | 2000271045 A | 10/2000 |
| JP | 2000325275 A | 11/2000 |
| JP | 2001234897 A | 8/2001 |
| JP | 2006144556 A | 6/2006 |
| JP | 3809601 B2 | 8/2006 |
| JP | 2009085141 A | 4/2009 |
| JP | 2010082365 A | 4/2010 |
| JP | 2012202283 A | 10/2012 |
| JP | 2012255352 A | 12/2012 |
| JP | 2012255412 A | 12/2012 |
| WO | 2012047228 A1 | 4/2012 |
| WO | 2012136906 A2 | 10/2012 |
| WO | 2014030755 A1 | 2/2014 |

OTHER PUBLICATIONS

International Preliminary Report on Patentability for International Application No. PCT/EP2014/055296, dated Sep. 20, 2016.

* cited by examiner

POWER EQUIPMENT COOLING SYSTEM

TECHNICAL FIELD

Example embodiments generally relate to outdoor power equipment and, more particularly, relate to a structure for power equipment cooling relative to the electronics and/or motor of the power equipment.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors. However, using an electric motor with mains power may inhibit mobility. As such, battery powered devices may become more popular.

Batteries and the components they power, however, may generate heat. If certain components such as, for example, the control unit or the electric motor become overheated, the product may stop working for awhile. Thus, it may become important to develop strategies for dealing with the heat load generated by battery powered, outdoor power equipment.

BRIEF SUMMARY OF SOME EXAMPLES

Some example embodiments may therefore provide structures that facilitate cooling of certain device components (e.g., the battery, control circuitry and/or the electric motor) without the addition of extra fans or other cooling structures that may increase the size, cost and/or complexity of outdoor power equipment.

A blower of an example embodiment may include a housing including a handle portion, a motor provided in a motor housing, a fan assembly operably coupled to the motor to force air through a blower tube responsive to operation of the motor, and control circuitry provided in a control unit housing portion of the housing to selectively apply power to the motor for operation of the motor. In some cases, the fan assembly draws air into an inlet portion to be expelled at an outlet of the blower tube responsive to operation of the motor. In an example embodiment, the control unit housing portion may include at least one inlet aperture in the housing to draw cooling air to cool the control unit prior to expelling the cooling air into the inlet portion via at least one outlet aperture.

A blower of an alternative example embodiment may include a housing including a handle portion, a motor provided in a motor housing, a fan assembly operably coupled to the motor to force air through a blower tube responsive to operation of the motor, and control circuitry provided in a control unit housing portion of the housing to selectively apply power to the motor for operation of the motor. In some cases, the fan assembly draws air into an inlet portion to be expelled at an outlet of the blower tube responsive to operation of the motor. The motor housing may further include at least one motor housing inlet aperture to enable a portion of the air passing through the fan assembly to enter the motor housing to cool the motor.

In accordance with another example embodiment, a method of cooling blower components is provided. The method may include rotating a fan assembly responsive to operation of a motor. The rotation of the fan assembly may create an underpressure region in an inlet portion and an overpressure region at a main channel of the fan assembly. The method may further include drawing air into the inlet portion through a control unit housing portion of a housing of the blower to cool a control unit of the blower, drawing air into the inlet portion through a battery compartment to cool a battery of the blower, and pushing air from the main channel through a motor housing to cool the motor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
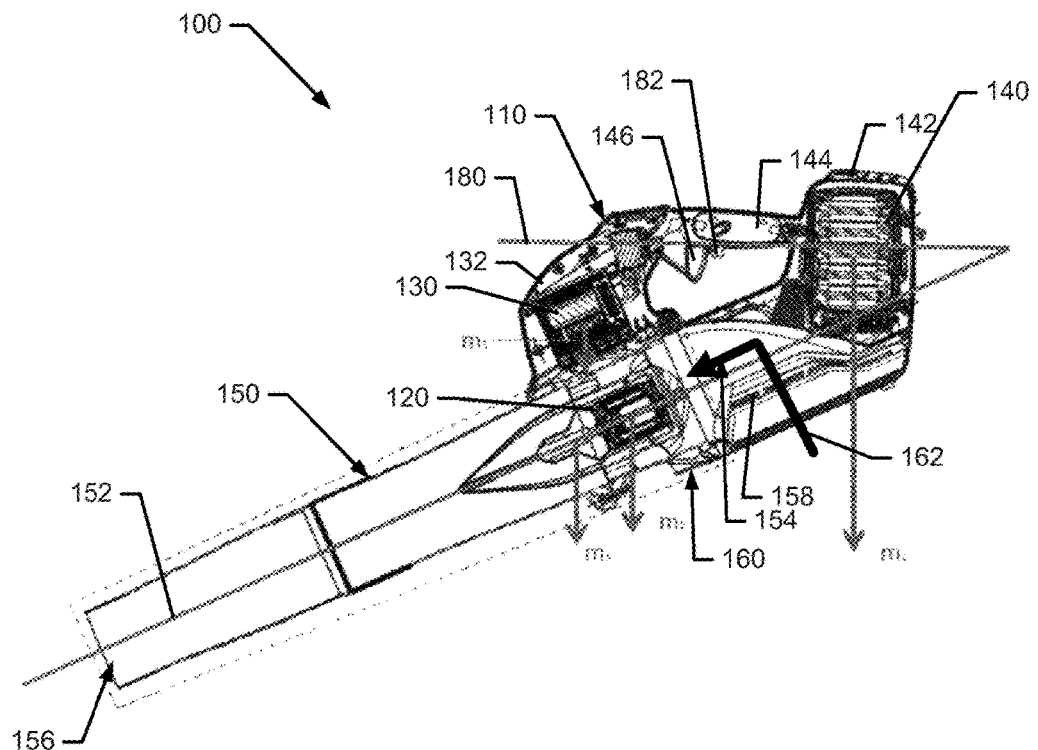
FIG. 1 illustrates a cutaway side view of a blower in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide structures for diverting air and/or drawing air past various components using underpressure and overpressure regions created due to normal blower operation. As such, cooling of certain components may be accomplished without the addition of extra components such as fans and/or the like. Components such as batteries, control circuitry, the motor and/or the like, may therefore be cooled with reduced cost and complexity while still increasing blower reliability.

FIG. 1 illustrates a cross sectional view of a blower 100 taken along a longitudinal centerline of the blower 100. It should be appreciated that the blower 100 of FIG. 1 merely represents one example of power equipment on which an example embodiment may be employed. Referring to FIG.

1, the blower 100 may include a housing 110 inside which various components of the blower 100 are housed. The blower 100 may further include a motor 120 or power unit for providing the driving force to move air through the blower 100. In some embodiments, the power unit may be a three phase electric motor that is operated under the control of a control unit 130 or control circuitry and powered by a battery 140 or battery adaptor. However, a DC motor could be used in some embodiments as well.

The housing 110 may be formed of plastic, composite materials, metals or any other desirable materials. In an example embodiment, the housing 110 may be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

In some embodiments, the control unit 130 may be housed in its own portion of the housing 110. The portion of the housing 110 in which the control unit 130 is housed may be referred to as a control unit housing portion 132, and the control unit housing portion 132 may be an integral part of a half-shell (as described above) or may be a separate housing portion that is joined to other housing portions. The control unit housing portion 132 may be disposed proximate to a portion of the housing 110 near which the motor 120 is provided.

In an example embodiment, the battery 140 may be housed in a battery compartment 142 that may be disposed at a rear portion of the housing 110, separated from the control unit housing portion 132 by a handle 144. The handle 144 may include a trigger 146 that may be operated by a finger of the operator while the operator holds the handle 144. Actuation of the trigger 146 may cause power from the battery 140 to be selectively applied to the motor 120 to turn the motor 120 based on control provided by the control unit 130. In some cases, the control unit 130 may include interlocks, protective functions or other control mechanisms that may sense various conditions of the blower 100 via sensors, switches or other mechanisms in order to selectively control the application of power to the motor 120 based on indications of user intent (e.g., via actuation of the trigger 146) and/or determinations regarding the state of the blower 100 as provided by the sensors, switches or other mechanisms.

It should be appreciated that although FIG. 1 shows an example in which the trigger 146 is used for selective powering of the motor 120, other example embodiments may employ a selector, switch, button or other such operative member in order to selectively control operation of the motor 120. Thus, for example, on/off, speed control or other operable functions for controlling the motor 120 may be performed using an operative member of any desirable form, and the trigger 146 is just one example.

The blower 100 may further include a blower tube 150 that is attached to housing 110 (or is a part of the housing 110) and through which air may be expelled. The blower tube 150 may define a blower tube axis 152, which defines an axial centerline of the blower tube 150. The blower tube 150 may include an inlet portion 154 and an outlet 156. The outlet 156 may be at a distal end of the blower tube 150 and the inlet portion 154 may be at an opposite end of the blower tube 150 proximate to the motor 120 and the battery 140. In particular, the inlet portion 154 may include louvers, vanes, guide holes or other such apertures 158 formed in the housing 110 to enable air to enter into the blower tube 150 responsive to operation of the motor 120 to be expelled via the outlet 156. In this regard, the operation of the motor 120 may cause an impeller or fan assembly 160 to rotate so that a low pressure area is generated to draw air into the inlet portion 154 through the apertures 158 to be passed through the fan assembly 160 and expelled from the blower tube 150 at the outlet 156 to blow leaves, debris, or any other material.

In some cases, as shown in FIG. 1, the motor 120 and the fan assembly 160 may each be coaxial with the blower tube axis 152, so that air exiting the fan assembly 160 is generally moved (although such flow may be turbulent) along a direction substantially parallel to the blower tube axis 152. However, air entering into the inlet portion 154 is generally drawn in at an angle relative to the blower tube axis 152. In some cases, the angle may be about 90 degrees as shown by arrow 162 in FIG. 1. However, the angle could be an obtuse angle in some embodiments. As such, the air entering into the blower tube 150 (i.e., inlet air) may undergo a direction change relative to the direction such air takes through the fan assembly 160 and/or through the blower tube 150 as the air approaches the outlet 156 (i.e., as outlet air). In some cases, the louvers, vanes, guide holes or other such apertures 158 formed in the housing 110 to embody the inlet portion 154 may be strategically located to reduce the ability of noise from the motor 120 or airflow in the blower tube 150 from transmitting up to the operator's ears. Moreover, the louvers, vanes, guide holes or other such apertures 158 of the inlet portion 154 may be formed on a side portion of the housing 110 as shown in FIG. 1.

In an example embodiment, the battery compartment 142 may be disposed at a rearward most end of the housing 110, which may be above or even rearward of the inlet portion 154. Meanwhile, the control unit housing portion 132 may be disposed proximate to the motor 120 outside of the blower tube 150. Thus, in reference to FIG. 1, the battery 140 is located at a rear of the blower 100 and the outlet 156 is at the front of the blower 100. The handle 144 is generally held by the operator in a manner that places the handle 144 at the top with the motor 120 suspended below the handle 144. With these relative positions identified for reference, it can be appreciated that the half of the housing 110 that is removed in FIG. 1 is the left half, and thus the right half of the housing 110 remains.

As shown in FIG. 1, the blower 100 may be designed for balance and optimal ergonomics while being operated. As such, the handle 144 is generally designed to extend substantially horizontal to the ground plane while the operator holds the blower 100 in a natural or comfortable grip as shown by line 180, which is parallel to the ground plane. Meanwhile, the blower tube axis 152 lies at an angle relative to line 180 and the ground plane. The angle may be between 15 degrees and 35 degrees in some embodiments, and could be selected based on balancing the centers of mass of the various components of the blower 100, while also generating a natural downward cant angle that generally points the outlet 156 toward the ground when the blower 100 is held in its most comfortable and natural position by the operator.

FIG. 1 shows example vectors indicative of the masses of various components of the blower 100. In this regard, $m_1$ represents the center of mass of the battery 140, which is relatively heavy and located at a rear portion of the blower 100, closest to the intersection of the blower tube axis 152 and line 180. Meanwhile, $m_2$ represents the smaller center of mass of the motor 120 and $m_3$ represents the center of mass of the control unit 130. When held at the handle 144, the "x" shape 182 represents a point about which the various centers of mass of the blower 100 are balanced. Thus, $m_4$ represents the center of mass of the fan assembly 160, which lies forward of the handle 144, along with the centers of mass of the motor 120 and the control unit 130 to counter the larger weight of the battery 140. Providing the handle 144 at an angle relative to the blower tube axis 152, and distributing the masses as provided in FIG. 1 causes the blower 100 to have a natural downward cant angle when held in its ergonomically optimized, balanced condition.

Figure 2:
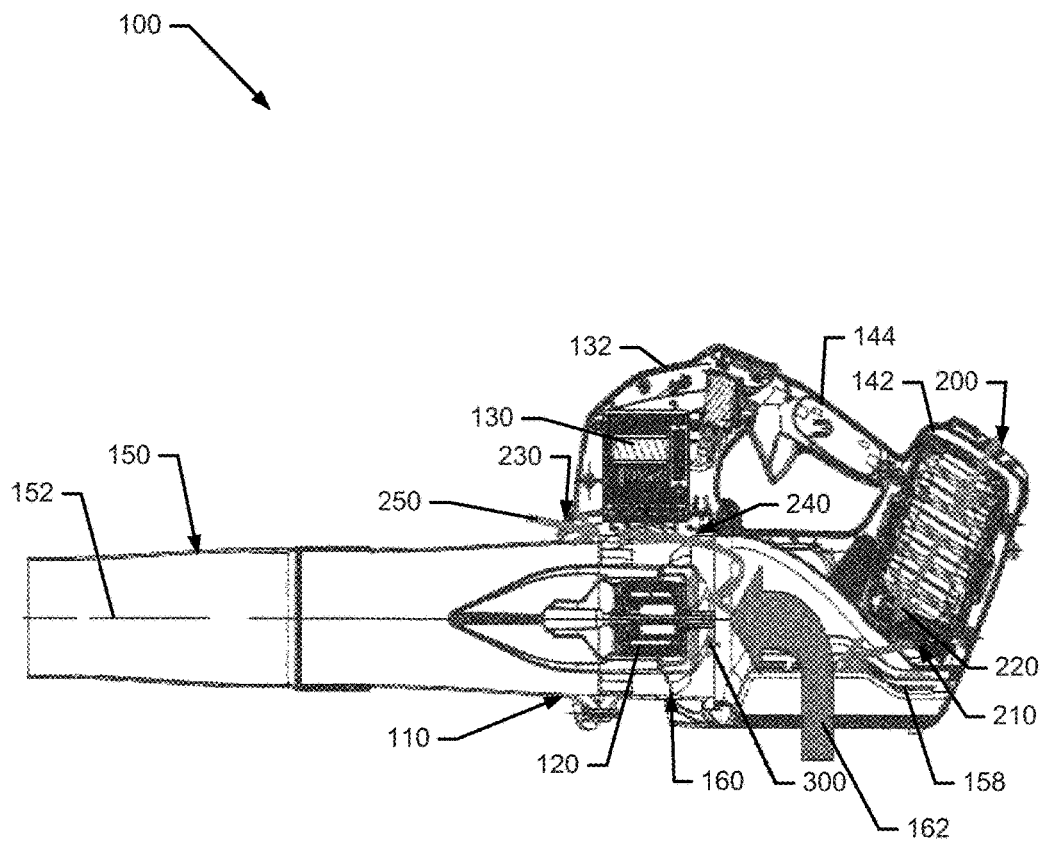
FIG. 2 illustrates a cutaway side view of a blower to show some structures for providing cooling of blower components in accordance with an example embodiment in accordance with an example embodiment.

As discussed above, the motor 120, the battery 140 and the control unit 130 may generate heat while in use. Accordingly, to reduce the risk of overheating these components, and maximize the reliability of the blower 100, these components should be effectively cooled. An example embodiment may therefore be provided with various airflow directing structures to facilitate cooling of these components. FIG. 2 illustrates some of these structures in accordance with an example embodiment.

As shown in FIG. 2, the battery compartment 142 may be provided with one or more inlet apertures 200 disposed at upper/rear portions of the battery compartment 142 and one or more outlet apertures 210 disposed at lower portions of the battery compartment 142 to allow air to be drawn through the battery compartment 142 and into the inlet portion 154. The inlet apertures 200 and/or the outlet apertures 210 may be formed at seams between the half-shells (if employed), or at any other suitable portion of the battery compartment 142. Accordingly, when the fan assembly 160 runs and creates a low pressure area proximate to an inlet of the fan assembly 160, the low pressure area that is created in the inlet portion 154 may draw air in through the louvers, vanes, guide holes or other such apertures 158 formed in the housing 110, but may also draw air into the inlet portion 154 via the inlet apertures 200, the battery compartment 142 and the outlet apertures 210. Arrows 220 are provided to show the airflow path through the battery compartment 142, which may cool the battery 140.

The airflow through the battery compartment 142, which is a much smaller component of the total volume of air passing through the fan assembly 160, may be slightly warmed relative to the temperature of the air entering the inlet portion as shown by arrow 162. However, the airflow represented by arrow 220 may be a relatively small proportion of the overall airflow that passes through the fan assembly 160 and therefore may not significantly heat the air temperature when mixed with airflow represented by arrow 162 in the inlet portion 154. Accordingly, no additional cooling fan or features need necessarily be provided and instead, the battery 140 can be cooled by air that is ultimately passed through the fan assembly 160.

As is also shown in FIG. 2, the control unit housing portion 132 may be provided with one or more inlet apertures 230 disposed at a forward portion of the control unit housing portion 132 and one or more outlet apertures 240 disposed at a rear portion of the control unit housing portion 132 to allow air to be drawn through the control unit housing portion 132 and into the inlet portion 154. The inlet apertures 230 and/or the outlet apertures 240 may be formed at seams between the half-shells (if employed), or at any other suitable portion of the control unit housing portion 132. Accordingly, when the fan assembly 160 runs and creates a low pressure area proximate to an inlet of the fan assembly 160, the low pressure area that is created in the inlet portion 154 may draw air in through the louvers, vanes, guide holes or other such apertures 158 formed in the housing 110, but may also draw air into the inlet portion 154 via the inlet apertures 230, the control unit housing portion 132 and the outlet apertures 240. Arrows 250 are provided to show the airflow path through the control unit housing portion 132, which may cool the control unit 130.

The airflow through the control unit housing portion 132, which is a much smaller component of the total volume of air passing through the fan assembly 160, may be slightly warmed relative to the temperature of the air entering the inlet portion as shown by arrow 162. However, the airflow represented by arrow 250 may be a relatively small proportion of the overall airflow that passes through the fan assembly 160 and therefore may not significantly heat the air temperature when mixed with airflow represented by arrow 162 in the inlet portion 154. Accordingly, no additional cooling fan or features need necessarily be provided and instead, the control unit 130 can be cooled by air that is ultimately passed through the fan assembly 160.

In an example embodiment, the outlet apertures 210 from the battery compartment 142 may be located rearward of the outlet apertures from the control unit housing portion 132. However, both outlet apertures 210 and 240 may generally be formed to allow air to pass into the inlet portion 154 for mixing with the main blower airflow represented by arrow 162. As can be appreciated from FIG. 2, each of the airflow paths may undertake a direction change to be incorporated into the air passed through the fan assembly 160 and ultimately expelled by the blower 100. In this regard, as mentioned above, the main inlet airflow represented by arrow 162 may make a direction change of about 90 degrees to be incorporated into the airflow through the fan assembly 160. The airflow through the battery compartment 142 as indicated by arrow 220 may undergo a direction change of less than 90 degrees to be incorporated into the airflow through the fan assembly 160. Meanwhile, the airflow through the control unit housing portion 132 as indicated by arrow 250 may undergo a direction change of substantially 180 degrees to be incorporated into the airflow through the fan assembly 160. Moreover, the airflow through the control unit housing portion 132 as indicated by arrow 250 may pass along an outside of the portion of the blower tube 150 proximate to which the motor 120 is housed in a direction substantially opposite to the direction of airflow through the fan assembly 160. As such, air cooling the control unit 130 moves in an opposite direction to the direction of airflow through the blower tube 150.

Figure 3:
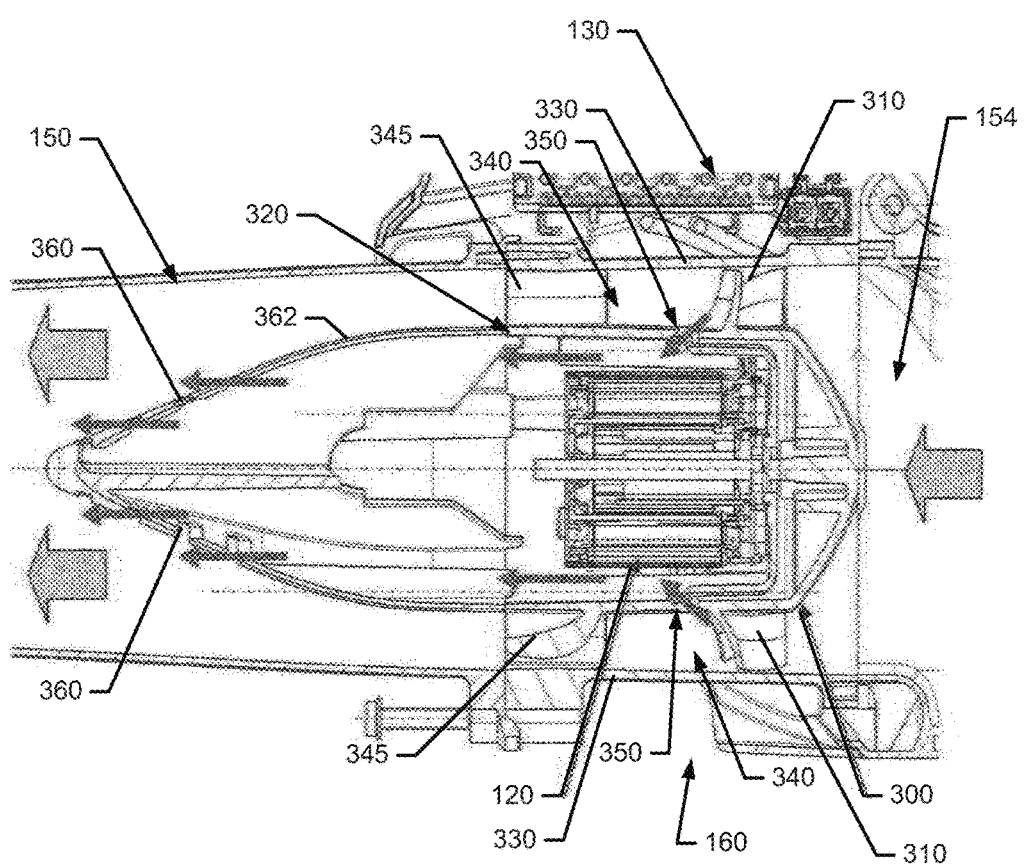
FIG. 3 illustrates a cross section view of an area of a blower tube proximate to the motor in accordance with an example embodiment.

In an example embodiment, the airflow through the blower tube 150 may therefore cool the battery 140 and the control unit 130. In some cases, the airflow through the blower tube 150 may additionally or alternatively also cool the motor itself. FIG. 3 illustrates a cross section view of the area of the blower tube 150 proximate to the motor 120 in accordance with an example embodiment. As shown in FIG. 3, the fan assembly 160 may include an axial rotor hub 300 that may be mounted onto a shaft turned with rotation of the motor 120. The axial rotor hub 300 may further include fan blades 310 extending radially outward from the axial rotor hub 300 between a motor housing 320 of the motor 120 and a tube wall 330 of (or connected to) the blower tube 150 to define a main channel 340 through which air is forced by rotation of the fan blades 310. The main channel 340 forms an annular cavity that surrounds the motor housing 320 and bounded by the tube wall 330 and defines an overpressure region when the fan blades 310 are rotated. An underpressure condition is created in the inlet portion 154 to draw air toward the fan blades 310 and then an overpressure condition is created in the main channel 340 to push the air through the blower tube 150 to the outlet 156. In some cases, stator vanes or stator blades 345 may be provided in (or at a terminus of) the main channel 340 to further direct air leaving the fan assembly 160 into the blower tube 150 to be projected toward the outlet 156.

As shown in FIG. 3, the motor housing 320 may include one or more motor housing rear apertures 350 formed therein at an area proximate to the main channel 340 to allow air to pass within the motor housing 320 to cool the motor 120 before entering back into the blower tube 150 via motor housing front apertures 360 that may be formed in a cone portion 362 of the motor housing 320. The overpressure condition formed in the main channel 340 may cause some air to be pushed into the motor housing rear apertures 350 to pass proximate to the motor 120 to remove heat from the motor 120 while passing to the motor housing front apertures 360. However, it should be appreciated that the front and rear apertures 360 and 350 may generally permit airflow in any direction through the motor housing 320 so that cooling air can pass proximate to the motor 120 for cooling purposes.

As can be appreciated from FIG. 3, the motor housing rear apertures 350 may be formed at a portion of the motor housing 320 that is between the fan blades 310 and the stator blades 345. Moreover, in some cases, the motor housing rear apertures 350 may be formed at a portion of the motor housing 320 that is proximate to and forward of the fan blades 310 (i.e., closest to a point where the overpressure is significant or maximum) to improve airflow through the motor housing 320. The airflow through the motor housing 320 may move in the same direction as the flow of air through the main channel 340 and through the blower tube 150 as the airflow in the motor housing proceeds to the motor housing front apertures 360 for incorporation into the main flow of air through the blower tube 150. However, as mentioned above, the direction need not be limited.

In an example embodiment that employs cooling of the control unit 130, the battery 140 and the motor 120 using airflow drawn through the fan assembly 160, it should be appreciated that the control unit 130 is cooled by system air (e.g., air drawn into the blower tube 150) upstream of the axial rotor hub 300, that the battery 140 is cooled by system air upstream of the axial rotor hub 300, and that the motor 120 is cooled by system air downstream of the axial rotor hub 300. These various components of the blower 100 can therefore be cooled to increase blower 100 reliability without adding separate cost, weight and complexity to achieve such cooling as no additional cooling fans are needed. Some embodiments may also enable a cheaper motor to be used as compared to integrating the housing into the fan system (which may save additional cost).

Figure 4:
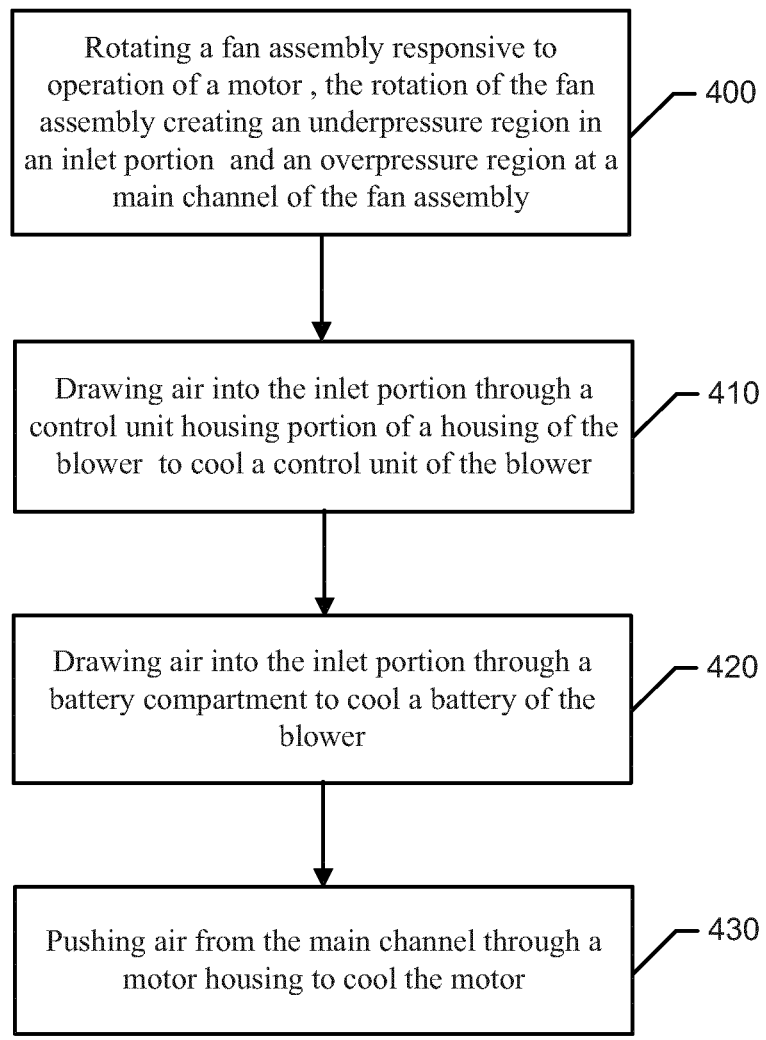
FIG. 4 is a block diagram of a method of cooling blower components in accordance with an example embodiment.

FIG. 4 illustrates a block diagram of an example of a method of cooling blower components. The method may include rotating a fan assembly responsive to operation of a motor at operation 400. The rotation of the fan assembly may create an underpressure region in an inlet portion and an overpressure region at a main channel of the fan assembly. The method may further include drawing air into the inlet portion through a control unit housing portion of a housing of the blower to cool a control unit of the blower at operation 410, drawing air into the inlet portion through a battery compartment to cool a battery of the blower at operation 420, and pushing air from the main channel through a motor housing to cool the motor at operation 430. In some embodiments, all air entering the inlet portion via the battery compartment, the control unit housing portion and/or via apertures in the housing undergoes a direction change prior to being expelled from the fan assembly.

A blower of an example embodiment may therefore include a housing including a handle portion, a motor provided in a motor housing, a fan assembly operably coupled to the motor to force air through a blower tube responsive to operation of the motor, and control circuitry provided in a control unit housing portion of the housing to selectively apply power to the motor for operation of the motor. In some cases, the fan assembly draws air into an inlet portion to be expelled at an outlet of the blower tube responsive to operation of the motor. In an example embodiment, the control unit housing portion may include at least one inlet aperture in the housing to draw cooling air to cool the control unit prior to expelling the cooling air into the inlet portion via at least one outlet aperture. Alternatively or additionally, the motor housing may further include at least one motor housing inlet aperture to enable a portion of the air passing through the fan assembly to enter the motor housing to cool the motor.

The electric power device of some embodiments may include additional features that may be optionally added either alone or in combination with each other. For example, in some embodiments, (1) the portion of the air that enters the motor housing may move in a direction substantially parallel to a tube axis of the blower tube prior to exiting the motor housing into the blower tube. In some cases, in addition, or as an alternative to (1), (2) the at least one motor housing inlet aperture may be located between a fan blade and a stator blade of the fan assembly. Additionally or alternatively, (3) the at least one motor housing inlet aperture may be located downstream of the fan assembly.

In some embodiments, any or all of (1) to (3) may be employed in addition to the optional modifications or augmentations described below. For example, in some embodiments, the cooling air may move in a first direction while passing between the at least one inlet aperture and the at least one outlet aperture, and may move in a second direction that is substantially opposite the first direction when incorporated into the air passed through the fan assembly. Additionally or alternatively, the blower may further include a battery that is housed or disposed in a battery compartment of the housing. The battery compartment may include at least one inlet aperture and at least one outlet aperture via which battery cooling air passes past the battery and into the inlet portion. Additionally or alternatively, air may primarily enter the inlet portion via apertures disposed on sides of the blower. In other words, a majority portion of the air in the inlet portion may enter via the apertures on the sides of the blower. In such an example, all air entering the inlet portion via the battery compartment, the control unit housing portion and/or via the apertures may undergo a direction change prior to being expelled from the fan assembly. Additionally or alternatively, the battery and the control unit may be cooled by air (e.g., system air) upstream of an axial rotor hub of the fan assembly and the motor may be cooled by air downstream of the axial rotor hub.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
   a housing including a handle portion;
   a motor provided in a motor housing;
   a fan assembly operably coupled to the motor to force air through a blower tube responsive to operation of the motor; and
   control circuitry provided in a control unit housing portion of the housing to selectively apply power to the motor for operation of the motor,
   wherein the fan assembly draws air through a first aperture into an inlet portion of the blower tube through the fan assembly to be expelled at an outlet of the blower tube responsive to operation of the motor, and
   wherein cooling air is drawn through a second aperture, the second aperture being different than the first aperture, through the control unit housing portion to be expelled at an outlet aperture of the control unit housing into the inlet portion of the blower tube.

2. The blower of claim 1, wherein the motor housing further comprises at least one motor housing inlet aperture to enable a portion of the air passing through the fan assembly to enter the motor housing to cool the motor.

3. The blower of claim 2, wherein the portion of the air that enters the motor housing moves in a direction parallel to a tube axis of the blower tube prior to exiting the motor housing into the blower tube.

4. The blower of claim 2, wherein the at least one motor housing inlet aperture is located between a fan blade and a stator blade of the fan assembly.

5. The blower of claim 2, wherein the at least one motor housing inlet aperture is located downstream at least a portion of the fan assembly.

6. The blower of claim 1, wherein the cooling air moves in a first direction while passing between the second inlet aperture and the outlet aperture, and moves in a second direction that is substantially opposite the first direction after being expelled from the outlet aperture and being incorporated into the air passed through the fan assembly.

7. The blower of claim 1, further comprising a battery disposed in a battery compartment of the housing, wherein the battery compartment includes at least one inlet aperture and at least one outlet aperture via which battery cooling air passes past the battery and into the inlet portion.

8. The blower of claim 7, wherein all air entering the inlet portion via the battery compartment or the control unit housing portion undergoes a direction change prior to being expelled from the fan assembly.

9. The blower of claim 7, wherein the battery and the control unit are cooled by air upstream of an axial rotor hub of the fan assembly and the motor is cooled by air downstream of the axial rotor hub.

10. A blower comprising:
    a housing including a handle portion;
    a motor provided in a motor housing;
    a fan assembly operably coupled to the motor to force air through a blower tube responsive to operation of the motor; and
    control circuitry provided in a control unit housing portion of the housing to selectively apply power to the motor for operation of the motor,
    wherein the fan assembly draws air through a first aperture into an inlet portion of the blower tube through the fan assembly to be expelled at an outlet of the blower tube responsive to operation of the motor,
    wherein the motor housing further comprises at least one motor housing inlet aperture to enable a portion of the air passing through the fan assembly to enter the motor housing to cool the motor, and
    wherein the at least one motor housing inlet aperture is located closer to the outlet of the blower tube than at least a portion the fan assembly.

11. The blower of claim 10, wherein the portion of the air that enters the motor housing moves in a direction parallel to a tube axis of the blower tube prior to exiting the motor housing into the blower tube.

12. The blower of claim 10, wherein the at least one motor housing inlet aperture is located between a fan blade and a stator blade of the fan assembly.

13. The blower of claim 10, wherein cooling air is drawn through a second aperture, the second aperture being different than the first aperture, through the control unit housing portion to be expelled at an outlet aperture of the control unit housing into the inlet portion of the blower tube.

14. The blower of claim 10, wherein the cooling air moves in a first direction while passing between the second inlet aperture and the outlet aperture, and moves in a second direction that is substantially opposite the first direction after being expelled through from the outlet aperture and being incorporated into the air passed through the fan assembly.

15. The blower of claim 10, further comprising a battery disposed in a battery compartment of the housing, wherein the battery compartment includes at least one inlet aperture and at least one outlet aperture via which battery cooling air passes past the battery and into the inlet portion.

16. The blower of claim 15, wherein wherein all air entering the inlet portion via the battery compartment or the control unit housing portion undergoes a direction change prior to being expelled from the fan assembly.

17. The blower of claim 15, wherein the battery and the control unit are cooled by air upstream of an axial rotor hub of the fan assembly and the motor is cooled by air downstream of the axial rotor hub.

18. A method of cooling blower components, the method comprising:
    rotating a fan assembly responsive to operation of a motor, the rotation of the fan assembly creating an underpressure region in an inlet portion and an overpressure region at a main channel of the fan assembly;
    drawing air through a first aperture into the inlet portion to be expelled at an outlet of a tube of the blower;
    drawing cooling air through a second aperture, the second aperture being different than the first aperture, into the inlet portion through a control unit housing portion of a housing of the blower to cool a control unit of the blower;

drawing air into the inlet portion through a battery compartment to cool a battery of the blower; and pushing air from the main channel through a motor housing to cool the motor.

19. The method of claim 18, wherein all air entering the inlet portion via the battery compartment or the control unit housing portion undergoes a direction change prior to being expelled from the fan assembly.

* * * * *